United States Patent
Okamatsu et al.

(10) Patent No.: US 9,657,164 B2
(45) Date of Patent: May 23, 2017

(54) EMULSION COAGULANT AND TIRE PUNCTURE REPAIR KIT USING SAME

(71) Applicant: THE YOKOHAMA RUBBER CO., LTD., Minato-Ku, Tokyo (JP)

(72) Inventors: Takahiro Okamatsu, Hiratsuka (JP); Masahiro Naruse, Hiratsuka (JP); Hideyuki Takahara, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 14/778,934

(22) PCT Filed: Mar. 20, 2014

(86) PCT No.: PCT/JP2014/057884
§ 371 (c)(1),
(2) Date: Sep. 21, 2015

(87) PCT Pub. No.: WO2014/148629
PCT Pub. Date: Sep. 25, 2014

(65) Prior Publication Data
US 2016/0046798 A1    Feb. 18, 2016

(30) Foreign Application Priority Data
Mar. 22, 2013    (JP) ................... 2013-060779

(51) Int. Cl.
| B29C 73/16 | (2006.01) |
| C08L 23/08 | (2006.01) |
| C08F 220/56 | (2006.01) |
| C08F 220/06 | (2006.01) |
| C08F 228/02 | (2006.01) |
| C08L 7/02 | (2006.01) |

(52) U.S. Cl.
CPC ........ *C08L 23/0853* (2013.01); *B29C 73/163* (2013.01); *C08F 220/06* (2013.01); *C08F 220/56* (2013.01); *C08F 228/02* (2013.01); *C08L 7/02* (2013.01); *C08L 2205/03* (2013.01)

(58) Field of Classification Search
CPC .................................................. B29C 73/163
USPC ......................................................... 523/166
See application file for complete search history.

(56) References Cited

U.S. PATENT DOCUMENTS

| 2009/0087400 A1 | 4/2009 | Tamareselvy |
| 2009/0200243 A1 | 8/2009 | Iwasaki et al. |
| 2011/0077327 A1 | 3/2011 | Okamatsu et al. |
| 2013/0072594 A1 | 3/2013 | Okamatsu et al. |
| 2013/0172465 A1 | 7/2013 | Okamatsu et al. |

FOREIGN PATENT DOCUMENTS

| CN | 101184530 A | 5/2008 |
| DE | 3027236 A1 | 9/1982 |
| JP | H02-308884 A | 12/1990 |
| JP | H0391508 A | 4/1991 |
| JP | H03-119088 A | 5/1991 |
| JP | H08-134431 A | 5/1996 |
| JP | 2000-017026 A | 1/2000 |
| JP | 2006-063204 A | 3/2006 |
| JP | 2007-146064 * | 6/2007 |
| JP | 2011-074194 A | 4/2011 |
| JP | 4784694 B1 | 10/2011 |
| WO | 2007/063688 A1 | 6/2007 |
| WO | 2011/148853 A1 | 12/2011 |
| WO | 2011/148854 A1 | 12/2011 |

OTHER PUBLICATIONS

Decision of Patent Grant issued in the corresponding Japanese Patent Application 2014-549017 with a drafting date of Jun. 4, 2014—the English translation with certificate of translation.
Notice of Reasons for Rejection issued in the corresponding Japanese Patent Application 2014-549017 with a drafting date of Mar. 6, 2015, and the English translation thereof with certificate of translation.
Office Action dated Feb. 22, 2016 issued to corresponding Chinese Patent Application No. 201480017047.7.
English translation of Office Action issued May 19, 2016 to the corresponding German Patent Application No. 112014001581.4.

\* cited by examiner

*Primary Examiner* — Edward Cain
(74) *Attorney, Agent, or Firm* — Carrier Blackman & Associates, P.C.; Joseph P. Carrier; Anne G. Sabourin

(57) ABSTRACT

An object of the present invention is to provide an emulsion coagulant capable of quickly coagulating an emulsion in an extremely low temperature environment. The present invention is an emulsion coagulant containing an amphoteric acrylic polymer, the amphoteric acrylic polymer having an amide group and a sulfonic acid group and having a weight average molecular weight of 30,000 or lower, and the emulsion coagulant being used to coagulate an emulsion. The present invention is also a tire puncture repair kit that uses the emulsion coagulant.

10 Claims, No Drawings

EMULSION COAGULANT AND TIRE PUNCTURE REPAIR KIT USING SAME

TECHNICAL FIELD

The present invention relates to an emulsion coagulant and a tire puncture repair kit using the same.

BACKGROUND

Conventionally, an emulsion coagulant has been used to recover a tire puncture repair agent after a tire puncture has been repaired using the tire puncture repair agent.

As emulsion coagulants, the inventors of the present application have thus far proposed a liquid coagulant which coagulates an emulsion containing natural rubber latex, the liquid coagulant containing a urethane resin and/or acrylic resin having a cationic functional group and having a pH of 2.0 to 4.0 (Patent Document 1).

PRIOR ART DOCUMENT

Patent Document

Patent Document 1: Japanese Patent No. 4784694B

SUMMARY OF THE INVENTION

Problem to be Solved by the Invention

The lower limit of the environmental temperature at which an emulsion coagulant is used within Japan was previously presumed to be −20° C., but overseas, it is necessary to use emulsion coagulants in very cold districts in even lower temperature environments (for example, an outside air temperature of −40° C. or lower) overseas.

The inventors of the present application have found that, when conventional emulsion coagulants are used in extremely low temperature conditions where an outside air temperature is −40° C. or lower, there is a problem in that the tire puncture repair agent does not coagulate.

Therefore, an object of the invention of present application is to provide an emulsion coagulant which can quickly coagulate an emulsion (e.g. tire puncture repair agent) in an extremely low temperature environment.

Means to Solve the Problem

As a result of diligent research to solve the above problem, the present inventors have found that an amphoteric acrylic polymer having an amide group and a sulfonic acid group and having a weight average molecular weight of 30,000 or lower can quickly coagulate an emulsion (e.g. tire puncture repair agent) in an extremely low temperature environment, and thus completed the present invention.

Specifically, the present invention provides the following 1 to 12.

1. An emulsion coagulant comprising: an amphoteric acrylic polymer having an amide group and a sulfonic acid group and having a weight average molecular weight of 30,000 or lower; the emulsion coagulant being used to coagulate an emulsion.
2. The emulsion coagulant according to 1 above, wherein a molar ratio of the amide group to the sulfonic acid group (amide group:sulfonic acid group) is [0.05 or greater but less than 0.3]:[0.95 or less but greater than 0.7].
3. The emulsion coagulant according to 1 or 2 above, wherein the amphoteric acrylic polymer is produced by using at least an amide group-containing polymerizable monomer and a sulfonic acid group-containing polymerizable monomer;
   the amide group-containing polymerizable monomer is acrylamide; and
   the sulfonic acid group-containing polymerizable monomer is acrylamide t-butyl sulfonic acid and/or methallylsulfonic acid.
4. The emulsion coagulant according to any one of 1 to 3 above, wherein the amphoteric acrylic polymer further has a carboxylic acid group.
5. The emulsion coagulant according to 4 above, wherein a molar ratio of the amide group to a total of the sulfonic acid group and the carboxylic acid group [amide group:(sulfonic acid group+carboxylic acid group)] is [0.05 or greater but less than 0.3]:[0.95 or less but greater than 0.7].
6. The emulsion coagulant according to 4 or 5 above, wherein a molar ratio of the carboxylic acid group to the sulfonic acid group (carboxylic acid group:sulfonic acid group) is from 0.1:0.9 to 0.9:0.1.
7. The emulsion coagulant according to any one of 1 to 6 above, wherein the amphoteric acrylic polymer is produced by using at least an amide group-containing polymerizable monomer, a sulfonic acid group-containing polymerizable monomer, and a carboxylic acid group-containing polymerizable monomer; and
   the carboxylic acid group-containing polymerizable monomer is methacrylic acid.
8. The emulsion coagulant according to any one of 1 to 7 above, further comprising water; wherein, an amount of the water is from 20 to 80% by mass in the emulsion coagulant; and an amount of the amphoteric acrylic polymer is from 10 to 70% by mass in the emulsion coagulant.
9. The emulsion coagulant according to any one of 1 to 8 above, wherein the emulsion is a tire puncture repair agent, and the tire puncture repair agent contains natural rubber latex and/or a synthetic resin emulsion, and an anti-freezing agent.
10. The emulsion coagulant according to 9 above, wherein the anti-freezing agent is at least one type selected from the group consisting of ethylene glycol, propylene glycol, diethylene glycol, and glycerin.
11. A tire puncture repair kit comprising the emulsion coagulant described in any one of 1 to 10 above and a tire puncture repair agent.
12. The tire puncture repair kit according to 11 above, wherein an amount of the emulsion coagulant is from 8 to 80 parts by mass per 100 parts by mass of the tire puncture repair agent.

Effect of the Invention

The emulsion coagulant of the present invention can quickly coagulate an emulsion in an extremely low temperature environment.

The tire puncture repair kit of the present invention can quickly coagulate a tire puncture repair agent in an extremely low temperature environment.

BEST MODE FOR CARRYING OUT THE INVENTION

The present invention is described in detail below.

The emulsion coagulant of the present invention is an emulsion coagulant comprising:

an amphoteric acrylic polymer having an amide group and a sulfonic acid group and having a weight average molecular weight of 30,000 or lower; the emulsion coagulant being used to coagulate an emulsion.

The emulsion coagulant of the present invention can quickly coagulate an emulsion (e.g. tire puncture repair agent) in an extremely low temperature environment since the emulsion coagulant contains the amphoteric acrylic polymer.

The amphoteric acrylic polymer will be described below. The amphoteric acrylic polymer contained in the emulsion coagulant of the present invention is both cationic and anionic due to having an amide group and a sulfonic acid group ($-SO_3H$), and the main chain of the amphoteric acrylic polymer is a (meth)acrylic resin. In the present invention, "(meth)acrylic" refers to both or either one of acrylic and methacryl.

An example of preferable aspects of the present invention is one in which 50 mol % or greater of all the monomers constituting the amphoteric acrylic polymer is a monomer having at least one type of group selected from the group consisting of (meth)acryloyl groups, (meth)acryloylamine groups (derived from a so-called (meth)acrylamide monomer) and (meth)acryloyloxy groups. Furthermore, an example of preferable aspects is one in which the main chain of the acrylic polymer is a (meth)acrylic resin.

The amide group can be bonded to the main chain directly or via an organic group. The same applies to the sulfonic acid group.

In the present invention, examples of the organic group include hydrocarbon groups that may have a hetero atom, such as an oxygen atom, nitrogen atom, and sulfur atom. Examples of the hydrocarbon group include aliphatic hydrocarbon groups, cycloaliphatic hydrocarbon groups, aromatic hydrocarbon groups, and combinations of these. The hydrocarbon group may be an open-chain or branched chain hydrocarbon group, and may have an unsaturated bond.

An example of a preferable aspect is one in which the amphoteric acrylic polymer has an amide group and a sulfonic acid group in a side chain.

In the present invention, the sulfonic acid group (sulfo group) may be a salt. Examples of a metal that forms a salt of the sulfonic acid group include alkali metals, such as sodium and potassium.

In the present invention, the amide group (amide group in a broad sense) refers to $-CONH_2$ (amide group in a narrow sense), $-CONHR$ (R represents a hydrocarbon group, and the hydrocarbon group is synonymous with those described above), or $-CONR_2$ (R represents a hydrocarbon group, and the hydrocarbon group is synonymous with those described above) (hereinafter the same).

Note that, in the present invention, when the amphoteric acrylic polymer has $-CONH$ (e.g. $-CONH-R$ described above) or $-CON$ (e.g. $-CONR_2$ described above) and a sulfonic acid group in a side chain or at a terminal, such a group is treated as a sulfonic acid group but not as an amide group. Specific examples include a case where a sulfonic acid group is bonded to R (if a plurality of R moieties exists, at least one of or both of the plurality of R moieties) in each of the formulas described above.

The amphoteric acrylic polymer preferably further contains a carboxylic acid group ($-COOH$) from the perspectives of capability of quickly coagulating an emulsion in an extremely low temperature environment (hereinafter, "capability of quickly coagulating an emulsion in an extremely low temperature environment" is also referred to as "quick coagulability") and capability of coagulating by use of a little amount.

An example of a preferable aspect is one in which the amphoteric acrylic polymer has a carboxylic acid group in a side chain and/or at a terminal.

In the present invention, the weight average molecular weight of the amphoteric acrylic polymer is 30,000 or less. From the perspectives of achieving superior quick coagulability and enabling coagulation by use of a little amount, the weight average molecular weight of the amphoteric acrylic polymer is preferably from 5000 to 30,000, and more preferably from 7000 to 25,000.

The amphoteric acrylic polymer can be produced by, for example, using a monomer that contains at least a vinyl monomer having an amide group (amide group-containing polymerizable monomer) and a vinyl monomer having a sulfonic acid group (sulfonic acid group-containing polymerizable monomer).

Examples of the amide group-containing polymerizable monomer include (meth)acrylic monomers as well as monomers, other than the (meth)acrylic monomers, that are copolymerizable with a (meth)acrylic monomer. The same applies to the sulfonic acid group-containing polymerizable monomer.

The (meth)acrylic monomer can have, for example, $CH_2=CR-$ (R represents a hydrogen atom or a methyl group), a (meth)acryloyl group, and/or a (meth)acryloyloxy group as well as an amide group or a sulfonic acid group. The monomer that is copolymerizable with a (meth)acrylic monomer can have, for example, a vinyl-based functional group such as $CH_2=CR-$ (R represents a hydrogen atom or a methyl group) as well as an amide group or a sulfonic acid group.

The amide group-containing polymerizable monomer is not particularly limited as long as the amide group-containing polymerizable monomer is a compound having at least one amide group (amide group in a broad sense) and at least one vinyl-polymerizable group.

Examples of the amide group include $-CONH_2$ (amide group in a narrow sense), $-CONHR$ (R represents a hydrocarbon group, and the hydrocarbon group is synonymous with those described above), and $-CONR_2$ (R represents a hydrocarbon group, and the hydrocarbon group is synonymous with those described above). Examples of $-CONR_2$ include dialkylamide groups, such as a dimethylamide group.

Examples of the vinyl-polymerizable group include vinyl groups, vinyl-based functional groups such as $CH_2=CR-$ (R represents a hydrogen atom or a methyl group); (meth)acryloyl groups, and (meth)acryloyloxy groups.

The amide group and the vinyl-polymerizable group can be bonded by a single bond or via an organic group. The organic group is synonymous with those described above. Specific examples include alkyl groups having from 1 to 10 carbons. When $CH_2=CR-$ and an amide group in a broad sense are bonded by a single bond, a (meth)acrylamide monomer can be formed as an amide group-containing polymerizable monomer.

Examples of the (meth)acrylamide monomer include a compound represented by a formula: $CH_2=CR^1-CONR^2_2$. In the formula, $R^1$ represents a hydrogen atom or a methyl group, and $R^2$ each independently represents a hydrogen atom or a hydrocarbon group. The hydrocarbon group is synonymous with those described above. When at least one of or both of the $R^2$ moieties are hydrocarbon groups, a compound in which a sulfonic acid or a salt thereof is bonded to the hydrocarbon group is treated as a sulfonic acid group-containing polymerizable monomer but not as an amide group-containing polymerizable monomer.

Specific examples of the amide group-containing polymerizable monomer include (meth)acrylamide ($CH_2=CR^1—CONH_2$); N-monoalkyl(meth)acrylamide; and N,N-dialkyl (meth)acrylamide, such as dimethylacrylamide.

The sulfonic acid group-containing polymerizable monomer is not particularly limited as long as the sulfonic acid group-containing polymerizable monomer is a compound having at least one sulfonic acid group and at least one vinyl-polymerizable group. The vinyl-polymerizable group is the same as those described above. The sulfonic acid group and the vinyl-polymerizable group can be bonded by a single bond or via an organic group. The organic group is synonymous with those described above.

Examples of the sulfonic acid group-containing polymerizable monomer include a compound represented by formula 1: $CH_2=CR^1—CONH_m—[R^2—(SO_3X)_a]_n$ and a compound represented by formula 2: $CH_2=CR^1—R^3—(SO_3X)_a$.

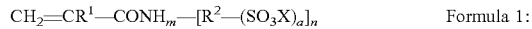

$$CH_2=CR^1—CONH_m—[R^2—(SO_3X)_a]_n \quad \text{Formula 1:}$$

In formula 1, $R^1$ represents a hydrogen atom or a methyl group, and $R^2$ represents a hydrocarbon group. The hydrocarbon group is synonymous with those described above. m is 0 or 1, n is 1 or 2, and m+n is 2. When X represents a hydrogen atom or an alkali metal (e.g. sodium, potassium) and a is 0 or 1 and n is 2, the plurality of $R^2—(SO_3X)$ moieties may be the same or different (however, when n is 2, two moieties of a are not simultaneously 0). The number of $—SO_3X$ in a molecule may be 1 or 2.

$$CH_2=CR^1—R^3—(SO_3X)_a \quad \text{Formula 2:}$$

In formula 2, $R^1$ represents a hydrogen atom or a methyl group, and $R^3$ represents a hydrocarbon group. The hydrocarbon group is synonymous with those described above. X represents a hydrogen atom or an alkali metal (e.g. sodium, potassium), and a is 1 or 2.

Specific examples of the sulfonic acid group-containing polymerizable monomer include a compound represented by formula 1 above, such as acrylamide t-butyl sulfonic acid; a compound represented by formula 2 above, such as methallylsulfonic acid [$CH_2=C(Me)-CH_2—SO_3H$]; and salts of these (e.g. sodium salt).

From the perspectives of achieving superior quick coagulability and enabling coagulation by use of a little amount, the molar ratio of the amide group contained in the amide group-containing polymerizable monomer to the sulfonic acid group contained in the sulfonic acid group-containing polymerizable monomer (amide group:sulfonic acid group) is preferably [0.05 or greater but less than 0.3]:[0.95 or less but greater than 0.7], and more preferably [0.1 or greater but 0.2 or less]:[0.9 or less but 0.8 or greater].

In the present invention, the amounts of the amide group, the sulfonic acid group, and the carboxylic acid group of the amphoteric acrylic polymer, respectively, almost directly reflect the amounts of corresponding groups contained in the (meth)acrylic monomer used in the production of the amphoteric acrylic polymer. Therefore, the preferable range of the molar ratio of the amide group to the sulfonic acid group (amide group:sulfonic acid group) of the amphoteric acrylic polymer is the same as the range described above.

When the amphoteric acrylic polymer further contains a carboxylic acid group, a carboxylic acid group-containing polymerizable monomer can be further used as the (meth)acrylic monomer.

The carboxylic acid group-containing polymerizable monomer is not particularly limited as long as the carboxylic acid group-containing polymerizable monomer is a compound having at least one carboxylic acid group and at least one vinyl-polymerizable group. The vinyl-polymerizable group is the same as those described above. The carboxylic acid group and the vinyl-polymerizable group can be bonded by a single bond or via an organic group. The organic group is the same as those described above.

Examples of the carboxylic acid group-containing polymerizable monomer include (meth)acrylic acid.

From the perspectives of achieving superior quick coagulability and enabling coagulation by use of a little amount, the molar ratio of the amide group contained in the amide group-containing polymerizable monomer to the total of the sulfonic acid group contained in the sulfonic acid group-containing polymerizable monomer and the carboxylic acid group contained in the carboxylic acid group-containing polymerizable monomer [amide group:(sulfonic acid group+carboxylic acid group)] is preferably [0.05 or greater but less than 0.3]:[0.95 or less but greater than 0.7], and more preferably [0.1 or greater but 0.2 or less]:[0.9 or less but 0.8 or greater]. The preferable range of the molar ratio of the amide group to the total of the sulfonic acid group and the carboxylic acid group [amide group:(sulfonic acid group+carboxylic acid group)] of the amphoteric acrylic polymer is the same as the range described above.

Note that, in the present invention, when a radical polymerization initiator that can be used in the production of the amphoteric acrylic polymer contains a sulfonic acid group and/or a carboxylic acid group, the amount of the sulfonic acid group and the carboxylic acid group does not include the amount of the sulfonic acid group and the carboxylic acid group derived from the radical polymerization initiator.

From the perspectives of achieving superior quick coagulability and enabling coagulation by use of a little amount, the molar ratio of the carboxylic acid group to the sulfonic acid group (carboxylic acid group:sulfonic acid group) is preferably from 0.1:0.9 to 0.9:0.1, and more preferably from 0.3:0.7 to 0.7:0.3.

From the perspectives of achieving superior quick coagulability and enabling coagulation by use of a little amount, the total number of moles of the amide group-containing polymerizable monomer and the sulfonic acid group-containing polymerizable monomer is preferably 50% or greater of the total number of moles of the monomers used in the production of the amphoteric acrylic polymer.

When the amphoteric acrylic polymer further contains a carboxylic acid group, the total number of moles of the amide group-containing polymerizable monomer, the sulfonic acid group-containing polymerizable monomer, and the carboxylic acid group-containing polymerizable monomer is preferably 50% or greater of the total number of moles of the monomers used in the production of the amphoteric acrylic polymer.

There is no particular limitation on the production of the amphoteric acrylic polymer. For example, the amphoteric acrylic polymer can be produced by subjecting monomers that at least contain the amide group-containing polymerizable monomer and the sulfonic acid group-containing polymerizable monomer (and that may further contain the carboxylic acid group-containing polymerizable monomer) to polymerization in water. During the polymerization, a radical polymerization initiator can be used. The polymerization initiator is not particularly limited. For example, the polymerization initiator may be a sulfonic acid group-containing polymerization initiator having a sulfonic acid group and/or a carboxylic acid group-containing polymerization initiator having a carboxylic acid group.

An aqueous solution of amphoteric acrylic polymer that is obtained by the polymerization in water can be used as the amphoteric acrylic polymer.

The emulsion coagulant of the present invention can further contain water. The amount of the water is preferably from 20 to 80% by mass, more preferably from 30 to 75% by mass, even more preferably from 30 to 70% by mass, and particularly preferably from 40 to 50% by mass, in the emulsion coagulant.

From the perspectives of achieving superior quick coagulability and enabling coagulation by use of a little amount, the amount of the amphoteric acrylic polymer is preferably from 10 to 70% by mass, more preferably 25 to 70% by mass, even more preferably from 30 to 70% by mass, and particularly preferably from 40 to 50% by mass, in the emulsion coagulant.

In addition to the components described above, the emulsion coagulant of the present invention may contain additives, such as amphoteric acrylic polymers other than those described above, anti-freezing agents, fillers, antiaging agents, antioxidants, pigments (dyes), plasticizers, thixotropic agents, UV absorbents, flame retardants, surfactants, dispersants, dehydrating agents, and antistatic agents, as desired when necessary.

When the emulsion coagulant of the present invention further contains an anti-freezing agent, the anti-freezing agent does not affect the performance of the emulsion coagulant. The anti-freezing agent is the same as those described below.

From the perspective of maintaining coagulation performance without being frozen in an extremely low temperature environment, the amount of the anti-freezing agent (e.g. propylene glycol) can be from 40 to 100 parts by mass per 100 parts by mass of water when the emulsion coagulant contains 100 parts by mass of the water per 100 parts by mass of the amphoteric acrylic polymer.

The production of the emulsion coagulant of the present invention is not particularly limited. For example, the emulsion coagulant can be produced by mixing an amphoteric acrylic polymer (including the amphoteric acrylic polymer produced by the production method described above) and additives that may be used as necessary.

The emulsion coagulant of the present invention may be formed from only the amphoteric acrylic polymer. Furthermore, the emulsion coagulant may be an aqueous solution only containing the amphoteric acrylic polymer. The emulsion coagulant may further contain an anti-freezing agent.

The emulsion coagulant of the present invention can be used to coagulate an emulsion. Examples of the emulsion include an emulsion in which emulsion particles are contained in water. Specific examples of the emulsion include tire puncture repair agents.

The tire puncture repair agent to which the emulsion coagulant of the present invention can be applied is not particularly limited. An example thereof is a tire puncture repair agent containing natural rubber latex (containing natural rubber particles as emulsion particles) and/or a synthetic resin emulsion (containing synthetic resin particles as emulsion particles), and an anti-freezing agent.

The synthetic resin emulsion serving as an emulsion that can be used in the tire puncture repair agent is not particularly limited, and examples thereof include conventionally known synthetic resin emulsions. Examples of synthetic resin emulsions include urethane emulsions, acrylic emulsions, polyolefin emulsions, ethylene vinyl acetate copolymer emulsions, polyvinyl acetate emulsions, ethylene-vinyl acetate-vinyl versatate copolymer emulsions, and polyvinyl chloride emulsions.

The emulsion is preferably natural rubber latex and/or a synthetic resin emulsion from the perspective of having excellent sealing performance and excellent in-vehicle stability.

Of these, ethylene vinyl acetate emulsions (for example, ethylene vinyl acetate copolymer emulsions), natural rubber latex, and vinyl acetate emulsions are preferable from the perspectives of being inexpensive and easy to obtain.

The natural rubber latex, ethylene vinyl acetate emulsions, and vinyl acetate emulsions are not particularly limited. Examples of each include conventionally known products.

The amount of the emulsion particles is preferably from 10 to 50% by mass, and more preferably from 20 to 45% by mass, of the tire puncture repair agent from the perspective of achieving excellent sealing performance and excellent mixing dispersibility with the tire puncture repair agent.

When the natural rubber latex and the synthetic resin emulsion are used in combination, the solid content ratio of the natural rubber to the synthetic resin is preferably from 10/90 to 80/20 from the perspective of achieving excellent sealing performance and excellent mixing dispersibility with the tire puncture repair agent.

An example of the anti-freezing agent is at least one type selected from the group consisting of ethylene glycol, propylene glycol, diethylene glycol, and glycerin.

The amount of the anti-freezing agent is preferably from 100 to 500 parts by mass, more preferably from 120 to 350 parts by mass, and even more preferably from 140 to 300 parts by mass per 100 parts by mass of solid content in the emulsion serving as the tire puncture repair agent from the perspective of achieving excellent performance in preventing the freezing of the tire puncture repair agent.

In addition to each of the components described above, the tire puncture repair agent may contain additives, such as tackifiers, fillers such as cellulose, antiaging agents, antioxidants, pigments (dyes), plasticizers, thixotropic agents, UV absorbents, flame retardants, surfactants (including leveling agents), dispersants, dehydrating agents, and antistatic agents, as desired when necessary.

The amount of the fillers is preferably from 1 to 50 parts by mass, and more preferably from 5 to 30 parts by mass, of the entire amount of the tire puncture repair agent from the perspective of achieving excellent sealability.

The production method of the tire puncture repair agent is not particularly limited. An example thereof is a method in which the emulsion, the anti-freezing agent, and the tackifier and additives that may be used as necessary are placed in a container and then sufficiently kneaded under reduced pressure using a mixer such as a combination mixer.

The emulsion coagulant of the present invention can be used for a used or unused tire puncture repair agent. When the emulsion coagulant of the present invention is used, the emulsion coagulant of the present invention may be mixed with the tire puncture repair agent. After mixing, the tire puncture repair agent is coagulated.

The used amount of the emulsion coagulant of the present invention is preferably from 8 to 80 parts by mass, and more preferably from 10 to 40 parts by mass, per 100 parts by mass of the tire puncture repair agent from the perspectives of achieving excellent coagulability in an extremely low temperature environment, enabling use over a wider range of temperatures, and achieving excellent mixing dispersibility with the tire puncture repair agent.

From the perspective of achieving superior quick coagulability, the amount of the amphoteric acrylic polymer is preferably from 3 to 40 parts by mass, more preferably from 4 to 40 parts by mass, and even more preferably from 5 to 20 parts by mass, per 100 parts by mass of the tire puncture repair agent.

The emulsion coagulant of the present invention can quickly coagulate a tire puncture repair agent in an extremely low temperature environment (for example, an outside air temperature of −40° C. or lower) and has excellent coagulability.

Furthermore, the emulsion coagulant of the present invention can quickly coagulate a tire puncture repair agent in environments with a wide range of temperatures. The emulsion coagulant of the present invention can be used, for example, in environments with a wide range of temperature conditions including −40° C. and up to and including 70° C.

Examples of the form (for example, the usage form or marketing form) of the emulsion coagulant of the present invention include the emulsion coagulant alone and a set including the emulsion coagulant and a tire puncture repair agent (tire puncture repair kit). A set including the emulsion coagulant and a tire puncture repair agent can be used as an emergency tire puncture repair kit. Furthermore, the emulsion coagulant of the present invention can be used to coagulate an unused tire puncture repair agent.

The tire puncture repair kit of the present invention will be described below.

The tire puncture repair kit of the present invention is a tire puncture repair kit having the emulsion coagulant of the present invention and a tire puncture repair agent.

The emulsion coagulant used in the tire puncture repair kit of the present invention is not particularly limited as long as the emulsion coagulant is the emulsion coagulant of the present invention. The tire puncture repair agent used in the tire puncture repair kit of the present invention is the same as those described above.

EXAMPLES

The present invention will be described below by means of working examples. The present invention is not limited to such working examples.

Evaluation

Coagulation time at −40° C. was evaluated by the evaluation method and evaluation criteria described below using an emulsion (tire puncture repair agent) produced as described below and an emulsion coagulant produced as described below.

Evaluation Method

An emulsion produced as described below was cooled to −40° C. To 100 parts by mass of the emulsion at −40° C., an emulsion coagulant produced as described below (solid content: 30%; ambient temperature) was added at the amount such that the amount of the amphoteric acrylic polymer (solid content of the emulsion coagulant) was the amount (part by mass) described in Table 1 below. The mixture was stirred for 5 minutes at a condition of −40° C.

After the stirring, the time (coagulation time) until the time when no liquid component seeped out from the mixture and fluidity was lost was measured. The results are shown in Table 1.

Evaluation Criteria

When the coagulation time was 30 minutes or shorter, the emulsion coagulant was evaluated as achieving excellent coagulability and indicated as "⊚". When the coagulation time was longer than 30 minutes but 40 minutes or shorter, the emulsion coagulant was evaluated as achieving good coagulability and indicated as "○". When the coagulation time was longer than 40 minutes but 60 minutes or shorter, the emulsion coagulant was evaluated as exhibiting poor coagulability and was not possible to be used as an emulsion coagulant, and indicated as "x". When the coagulation time was longer than 60 minutes or when the mixture was not coagulated, the emulsion coagulant was evaluated as exhibiting bad coagulability and was not possible to be used as an emulsion coagulant, and indicated as "xx".

Production of Emulsion Coagulant

An amide group-containing polymerizable monomer, a sulfonic acid group-containing polymerizable monomer, a carboxylic acid group-containing polymerizable monomer, and a polymerization initiator described in Table 1 were used at the amounts described in the same table, and 100 mL of water was added thereto to perform radical polymerization for 6 hours under conditions at 70° C. Thereafter, the polymerization was terminated, and an aqueous solution containing an amphoteric acrylic polymer was obtained. The obtained aqueous solutions were used as the emulsion coagulants 1 to 18.

Weight Average Molecular Weight of Amphoteric Acrylic Polymer

The emulsion coagulant produced as described above was dried. The weight average molecular weight of the amphoteric acrylic polymer that was obtained after the drying was measured, in terms of standard polystyrene, by gel permeation chromatography (GPC) using dimethylformamide as a solvent. The results are shown in Table 1.

Production of Emulsion

Components described in the row of emulsion in Table 1 were used at the amounts (part by mass) described in the same table, and mixed to produce an emulsion.

TABLE 1

| | | | Working Example | | | | | | | | | | | | Comparative Example | | |
|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 |
| | Raw material | Molecular weight | Polymerization Examples [composition (% molar ratio)] | | | | | | | | | | | | | |
| | | | 4 | 5 | 6 | 7 | 8 | 9 | 10 | 11 | 12 | 13 | 14 | 15 | 16 | 17 |
| Emulsion coagulant (production) | Amide group-containing polymerizable monomer | Acrylamide 71.08 | 0.05 | ↓ | ↓ | ↓ | ↓ | ↓ | 0.1 | 0.2 | 0.2 | 0.3 | 0.1 | 0.2 | 0.3 | 0.1 |
| | Sulfonic acid group-containing polymerizable monomer | Acrylamide t-butyl sulfonic acid 207.24 | 0.5 | | | | | | | 0.4 | | | | | | |
| | | Methal-ylsulfonic acid 158.15 | | | | | | | 0.45 | | | | 0.45 | 0.4 | | 0.9 |
| | Carboxylic acid group-containing polymerizable monomer | Methacrylic acid 84 | 0.45 | ↓ | ↓ | ↓ | ↓ | ↓ | 0.45 | 0.4 | ↓ | 0.3 | 0.45 | 0.4 | 0.3 | 0 |
| | Total number of moles of monomers (unit: mol) | | 1 | ↓ | ↓ | ↓ | ↓ | ↓ | ↓ | ↓ | ↓ | ↓ | ↓ | ↓ | ↓ | ↓ |
| | Polymerization initiator | Azobis-cyanovaleric acid (part by mass) 280 | 0.005 | 0.01 | 0.02 | 0.05 | 0.075 | 0.1 | ↓ | ↓ | 0.2 | ↓ | 0.075 | ↓ | ↓ | ↓ |
| | Carboxylic acid group:Sulfonic acid group (molar ratio) | | 0.45: 0.5 | ↓ | ↓ | ↓ | ↓ | ↓ | 0.45: 0.45 | 0.4: 0.4 | ↓ | 0.3: 0.4 | 0.45: 0.45 | 0.4: 0.4 | 0.3: 0.4 | 0: 0.9 |
| | Number of moles of sulfonic acid group + carboxylic acid group | | 0.95 | ↓ | ↓ | ↓ | ↓ | ↓ | 0.9 | 0.8 | ↓ | 0.7 | 0.9 | 0.8 | 0.7 | 0.9 |
| | Molar ratio of [amide group:(sulfonic acid group + carboxylic acid group)] | | 0.05: 0.95 | ↓ | ↓ | ↓ | ↓ | ↓ | 0.1: 0.9 | 0.2: 0.8 | ↓ | 0.3: 0.7 | 0.1: 0.9 | 0.2: 0.8 | 0.3: 0.7 | 0.1: 0.9 |
| | Produced emulsion coagulant | | 4 | 5 | 6 | 7 | 8 | 9 | 10 | 11 | 12 | 13 | 14 | 15 | 16 | 17 |
| | Weight average molecular weight of amphoteric acrylic polymer | | 28500 | 20100 | 13400 | 9900 | 6700 | 7100 | 6000 | 5200 | 2300 | 5800 | 7300 | 6900 | 7200 | 8000 |
| Emulsion (part by mass) | Emulsion 1 | NR | 30 | ↓ | ↓ | ↓ | ↓ | ↓ | ↓ | ↓ | ↓ | ↓ | ↓ | ↓ | ↓ | ↓ |
| | Emulsion 2 | EVA | 30 | ↓ | ↓ | ↓ | ↓ | ↓ | ↓ | ↓ | ↓ | ↓ | ↓ | ↓ | ↓ | ↓ |
| | Anti-freezing agent | PG | 40 | ↓ | ↓ | ↓ | ↓ | ↓ | ↓ | ↓ | ↓ | ↓ | ↓ | ↓ | ↓ | ↓ |
| | Total amount of components above | | 100 | | | | | | | | | | | | | |
| Produced emulsion coagulant (amount of amphoteric acrylic polymer indicated | 1 2 3 | | | | | | | | | | | | | | | |

TABLE 1-continued

| in part by mass) | | | | | | | | | | | | | | |
|---|---|---|---|---|---|---|---|---|---|---|---|---|---|---|
| 4 | | | | | | | | | | | | | | |
| 5 | | 5 | | | | | | | | | | | | |
| 6 | | | 5 | | | | | | | | | | | |
| 7 | | | | 5 | | | | | | | | | | |
| 8 | | | | | 5 | | | | | | | | | |
| 9 | | | | | | 5 | | | | | | | | |
| 10 | | | | | | | 5 | | | | | | | |
| 11 | | | | | | | | 5 | | | | | | |
| 12 | | | | | | | | | 5 | | | | | |
| 13 | | | | | | | | | | 7 | | | | |
| 14 | | | | | | | | | | | 5 | | | |
| 15 | | | | | | | | | | | | 5 | | |
| 16 | | | | | | | | | | | | | 7 | |
| 17 | | | | | | | | | | | | | | 5 |
| Coagulation time at −40° C. (min) | 40 | 20 | 15 | 20 | 20 | 20 | 20 | 25 | 25 | 40 | 25 | 25 | 40 | 40 |
| Result | ○ | ⊚ | ⊚ | ⊚ | ⊚ | ⊚ | ⊚ | ⊚ | ⊚ | ○ | ⊚ | ⊚ | ○ | ○ |

Working Example 15, 16, 17, 18, 19, 20 / Comparative Example

| | | Raw material Molecular weight | 1 | 2 | 3 | 4 | 5 | 6 | 7 | 8 | 9 |
|---|---|---|---|---|---|---|---|---|---|---|---|
| | | (production) | | | | Polymerization Examples [composition (% molar ratio)] | | | | | |
| Emulsion coagulant | Amide group-containing polymerizable monomer | Acrylamide 71.08 | 0 | 0.5 | ↓ | 0.1 | 0.1 | 0.5 | ↓ | ↓ | ↓ |
| | Sulfonic acid group-containing polymerizable monomer | Acrylamide t-butyl sulfonic acid 207.24 | 0.5 | 0.5 | | | | 0.5 | | | |
| | | Methal-lylsulfonic acid 158.15 | | | | 0 | 0 | | | | |
| | Carboxylic acid group-containing polymerizable monomer | Methacrylic acid 84 | 0.5 | 0.45 | ↓ | 0.9 | 0.9 | 0.45 | ↓ | ↓ | ↓ |
| | Total number of moles of monomers (unit: mol) | | 1 | ↓ | ↓ | ↓ | ↓ | ↓ | ↓ | ↓ | ↓ |
| Polymerization initiator | Azobis-cyanovaleric acid (part by mass) | 280 | 0.075 | 0.001 | 0.003 | ↓ | ↓ | 0.02 | 0.05 | 0.075 | 0.1 | 0.02 | 0.02 |
| | Carboxylic acid group:Sulfonic acid group (molar ratio) | | 0.5:0.5 | 0.45:0.5 | ↓ | 0.9:0 | 0.9:0 | 0.45:0.5 | ↓ | ↓ | ↓ |
| | Number of moles of sulfonic acid group + carboxylic acid group | | 1 | 0.95 | ↓ | 0.9 | 0.9 | 0.95 | ↓ | ↓ | ↓ |

TABLE 1-continued

| | | | | | | | | | | | | |
|---|---|---|---|---|---|---|---|---|---|---|---|---|
| Molar ratio of [amide group:(sulfonic acid group + [carboxylic acid group)] | 0:1 | 0.05:0.95 | ↓ | 0.1:0.9 | 0.1:0.9 | 0.05:0.95 | ↓ | ↓ | ↓ | ↓ | ↓ | ↓ |
| Produced emulsion coagulant | 1 | 2 | 3 | ↓ | ↓ | 6 | 7 | 8 | 9 | ↓ | ↓ | ↓ |
| Weight average molecular weight of amphoteric acrylic polymer | 6500 | 367500 | 167900 | 7200 | 7200 | 13400 | 9900 | 6700 | 7100 | 13400 | 13400 | 13400 |
| Emulsion (part by mass) Emulsion 1 NR | 30 | ↓ | ↓ | ↓ | ↓ | ↓ | ↓ | ↓ | ↓ | ↓ | ↓ | ↓ |
| Emulsion 2 EVA | 30 | ↓ | ↓ | ↓ | ↓ | ↓ | ↓ | ↓ | ↓ | ↓ | ↓ | ↓ |
| Anti-freezing agent PG | 40 | ↓ | ↓ | ↓ | ↓ | ↓ | ↓ | ↓ | ↓ | ↓ | ↓ | ↓ |
| Total amount of components above | 100 | ↓ | ↓ | ↓ | ↓ | ↓ | ↓ | ↓ | ↓ | ↓ | ↓ | ↓ |
| Produced emulsion coagulant (amount of amphoteric acrylic polymer indicated in part by mass) 1 | 5 | | | | | | | | | | | |
| 2 | | 5 | | | | | | | | | | |
| 3 | | | 5 | | | | | | | | | |
| 4 | | | | | | | | | | | | |
| 5 | | | | | | | | | | | | |
| 6 | | | | | | 4 | | | | | | |
| 7 | | | | | | | 3 | | | | | |
| 8 | | | | | | | | 4 | | | | |
| 9 | | | | | | | | | 4 | | | |
| 10 | | | | | | | | | | | | |
| 11 | | | | | | | | | | | | |
| 12 | | | | | | | | | | | | |
| 13 | | | | | | | | | | | | |
| 14 | | | | | | | | | | | | |
| 15 | | | | | | | | | | | | |
| 16 | | | | | | | | | | | | |
| 17 | | | | | | | | | | 30 | 20 | |
| 18 | | | | | | | | | | | | 40 |
| Coagulation time at −40°C. (min) | 60< | 50 | 45 | 5 / 60< | 12 / 45 | 30 | 25 | 30 | 30 | 30 | 20 | 10 |
| Result | XX | X | X | XX | X | ◎ | ◎ | ◎ | ◎ | ◎ | ◎ | ◎ |

The details of each component described in Table 1 are as follows.

Acrylamide: manufactured by Wako Pure Chemical Industries, Ltd.

Acrylamide t-butyl sulfonic acid: manufactured by Wako Pure Chemical Industries, Ltd.

Methallylsulfonic acid: manufactured by Wako Pure Chemical Industries, Ltd.

Methacrylic acid: manufactured by Wako Pure Chemical Industries, Ltd.

Azobiscyanovaleric acid: manufactured by Wako Pure Chemical Industries, Ltd.

Emulsion 1 NR: natural rubber emulsion (HA Latex; solid content: 60% by mass; manufactured by Golden Hope)

Emulsion 2 EVA: ethylene vinyl acetate emulsion (solid content: 51% by mass; Sumika Flex S-408HQE; manufactured by Sumika Chemtex Co., Ltd.)

Anti-freezing agent PG: propylene glycol (solid content: 100% by mass; manufactured by Wako Pure Chemical Industries, Ltd.)

As is clear from the results shown in Table 1, Comparative Example 1 which contained an acrylic polymer having no amide group could not coagulate the emulsion in an extremely low temperature environment. Comparative Examples 2 and 3 in which the weight average molecular weight of the polymer exceeded 30,000 exhibited poor coagulation performances in an extremely low temperature environment. Comparative Example 4 which contained a polymer having no sulfonic acid group could not coagulate the emulsion in an extremely low temperature environment. Furthermore, Comparative Example 5 which contained a polymer having no sulfonic acid group exhibited poor coagulation performances in an extremely low temperature environment even though the amount of the polymer was increased.

On the other hand, Working Examples 1 to 20 were capable of quickly coagulating the emulsion in an extremely low temperature environment. Furthermore, Working Examples 1 to 20 were capable of coagulating the emulsion by addition of a little amount in such an environment.

Therefore, the emulsion coagulant of the present invention can quickly coagulate an emulsion in an extremely low temperature environment. Furthermore, the emulsion coagulant of the present invention can quickly coagulate an emulsion by addition of a little amount in such an environment.

What is claimed is:

1. A composition comprising an emulsion coagulant including: an amphoteric acrylic polymer having an amide group and a sulfonic acid group and having a weight average molecular weight of 13,400 or lower, wherein a molar ratio of the amide group to the sulfonic acid group (amide group:sulfonic acid group) is [0.05 or greater but 1/3 or less]:[0.95 or less but 2/3 or greater], wherein the amphoteric acrylic polymer is produced by using at least an amide group-containing polymerizable monomer and a sulfonic acid group-containing polymerizable monomer;

the amide group-containing polymerizable monomer is acrylamide; and the sulfonic acid group-containing polymerizable monomer is at least one of acrylamide t-butyl sulfonic acid and methallylsulfonic acid, and wherein the amphoteric acrylic polymer further has a carboxylic acid group.

2. The composition according to claim 1, wherein a molar ratio of the amide group to the sulfonic acid group (amide group:sulfonic acid group) is [0.05 or greater but less than 0.3]:[0.95 or less but greater than 0.7].

3. The composition according to claim 1, wherein a molar ratio of the amide group to a total of the sulfonic acid group and the carboxylic acid group [amide group:(sulfonic acid group+carboxylic acid group)] is [0.05 or greater but less than 0.3]:[0.95 or less but greater than 0.7].

4. The composition according to claim 1, wherein a molar ratio of the carboxylic acid group to the sulfonic acid group (carboxylic acid group:sulfonic acid group) is from 0.1:0.9 to 0.9:0.1.

5. The composition according to claim 1, wherein the amphoteric acrylic polymer is produced by using at least an amide group-containing polymerizable monomer, a sulfonic acid group-containing polymerizable monomer, and a carboxylic acid group-containing polymerizable monomer; and the carboxylic acid group-containing polymerizable monomer is methacrylic acid.

6. The composition according to claim 1, further comprising water; wherein, an amount of the water is from 20 to 80% by mass in the emulsion coagulant; and an amount of the amphoteric acrylic polymer is from 10 to 70% by mass in the emulsion coagulant.

7. The composition according to claim 1, wherein the emulsion is a tire puncture repair agent, and the tire puncture repair agent contains natural rubber latex and/or a synthetic resin emulsion, and an anti-freezing agent.

8. The composition according to claim 7, wherein the anti-freezing agent is at least one type selected from the group consisting of ethylene glycol, propylene glycol, diethylene glycol, and glycerin.

9. A tire puncture repair kit comprising the composition described in claim 1 and a tire puncture repair agent.

10. The tire puncture repair kit according to claim 9, wherein an amount of the emulsion coagulant is from 8 to 80 parts by mass per 100 parts by mass of the tire puncture repair agent.

* * * * *